US012271803B2

United States Patent
Kuo et al.

(10) Patent No.: US 12,271,803 B2
(45) Date of Patent: *Apr. 8, 2025

(54) SYSTEMS AND METHODS FOR PREDICTING AND PROVIDING AUTOMATED ONLINE CHAT ASSISTANCE

(71) Applicant: PAYPAL, INC., San Jose, CA (US)

(72) Inventors: Yu-Hsuan Kuo, San Jose, CA (US); Venkata Ramana Nadimpalli, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,194

(22) Filed: Feb. 27, 2023

(65) Prior Publication Data
US 2023/0222316 A1  Jul. 13, 2023

Related U.S. Application Data

(63) Continuation of application No. 16/665,709, filed on Oct. 28, 2019, now Pat. No. 11,593,608.

(51) Int. Cl.
*H04L 51/04* (2022.01)
*G06N 3/04* (2023.01)
(Continued)

(52) U.S. Cl.
CPC ............. *G06N 3/04* (2013.01); *G06N 3/08* (2013.01); *G06N 5/04* (2013.01); *H04L 51/02* (2013.01);
(Continued)

(58) Field of Classification Search
CPC .. G06N 3/04; G06N 3/08; G06N 5/04; G06N 20/00; H04L 51/02; H04L 51/04; H04L 65/1069; H04L 65/70; H04L 65/4015
(Continued)

(56) References Cited

U.S. PATENT DOCUMENTS 8,880,405 B2 * 11/2014 Cerra ...................... G10L 15/30
704/275
10,635,751 B1    4/2020 Relangi et al.
(Continued)

FOREIGN PATENT DOCUMENTS

IN    201811034489 A    9/2018

OTHER PUBLICATIONS

Devlin J., et al., "BERT: Pre-training of Deep Bidirectional Transformers for Language Understanding", Proceedings of the 2019 Conference of the North American Chapter of the Association for Computational Linguistics: Human Language Technologies, 2019, Minneapolis, Minnesota, https://arxiv.org/pdf/1810.04805.pdf">https://arxiv.org/pdf/1810.04805.pdf, pp. 4171-4186.

(Continued)

*Primary Examiner* — Karen C Tang
(74) *Attorney, Agent, or Firm* — Haynes and Boone, LLP

(57) ABSTRACT

Methods and systems are presented for providing automated online chat assistance in an online chat session. One or more utterances transmitted from a user device of a user via the online chat session are obtained. The one or more utterances are provided to a first prediction model to predict an intent of a user. If it is determined that the first prediction model is unable to predict the intent of the user based on the one or more utterances, the one or more utterances are provided to a second prediction model. After predicting the intent of the user by the second prediction model, the intent is used by a chat robot to provide a dialogue with the user via the online chat session. The one or more utterances and the predicted intent are used to re-train the first prediction model.

20 Claims, 9 Drawing Sheets

(51) Int. Cl.
  *G06N 3/08* (2023.01)
  *G06N 5/04* (2023.01)
  *H04L 51/02* (2022.01)
  *H04L 65/1069* (2022.01)

(52) U.S. Cl.
  CPC .......... *H04L 51/04* (2013.01); *H04L 65/1069* (2013.01)

(58) Field of Classification Search
  USPC .......................................................... 709/224
  See application file for complete search history.

(56) References Cited

U.S. PATENT DOCUMENTS

| | | | |
|---|---|---|---|
| 10,705,796 | B1 | 7/2020 | Doyle |
| 11,715,042 | B1* | 8/2023 | Liu ........................ G06N 3/006 |
| | | | 705/26.1 |
| 2009/0245500 | A1 | 10/2009 | Wampler |
| 2011/0289025 | A1 | 11/2011 | Yan et al. |
| 2014/0288932 | A1* | 9/2014 | Yeracaris ................ G10L 17/10 |
| | | | 704/249 |
| 2018/0137349 | A1* | 5/2018 | Such ................... G06V 30/414 |
| 2018/0268813 | A1 | 9/2018 | Georges et al. |
| 2019/0108450 | A1 | 4/2019 | Byron et al. |
| 2019/0163694 | A1 | 5/2019 | Yao |
| 2019/0206393 | A1 | 7/2019 | Fang et al. |
| 2019/0251104 | A1 | 8/2019 | Branavan et al. |
| 2019/0347319 | A1* | 11/2019 | Goyal ................... G06F 40/174 |
| 2020/0311204 | A1 | 10/2020 | Gupta et al. |
| 2020/0344185 | A1* | 10/2020 | Singaraju ............... G06N 3/008 |
| 2021/0004442 | A1* | 1/2021 | Sapugay ................ G06F 40/253 |
| 2021/0026735 | A1* | 1/2021 | Hall ........................ G10L 15/22 |
| 2021/0044547 | A1 | 2/2021 | Bradley et al. |
| 2021/0050006 | A1* | 2/2021 | Andreas ................. G06N 20/00 |
| 2021/0081615 | A1* | 3/2021 | McRitchie .............. H04L 51/02 |
| 2021/0081837 | A1* | 3/2021 | Polleri ................... G06N 5/022 |
| 2021/0082400 | A1* | 3/2021 | Vishnoi ................. G06F 40/284 |
| 2021/0082424 | A1 | 3/2021 | Johnson |
| 2021/0089860 | A1 | 3/2021 | Heere et al. |
| 2021/0097110 | A1 | 4/2021 | Asthana et al. |
| 2021/0118440 | A1 | 4/2021 | Peng et al. |
| 2021/0125190 | A1 | 4/2021 | Coman et al. |
| 2021/0157990 | A1 | 5/2021 | Lima et al. |
| 2021/0350209 | A1 | 11/2021 | Wang et al. |

OTHER PUBLICATIONS

International Appl. No. PCT/US2020/057564, International Search Report and Written Opinion mailed on Jan. 12, 2021, 14 pages.
International Preliminary Report on Patentability for Application No. PCT/US2020/057564 mailed on May 12, 2022, 9 pages.

* cited by examiner

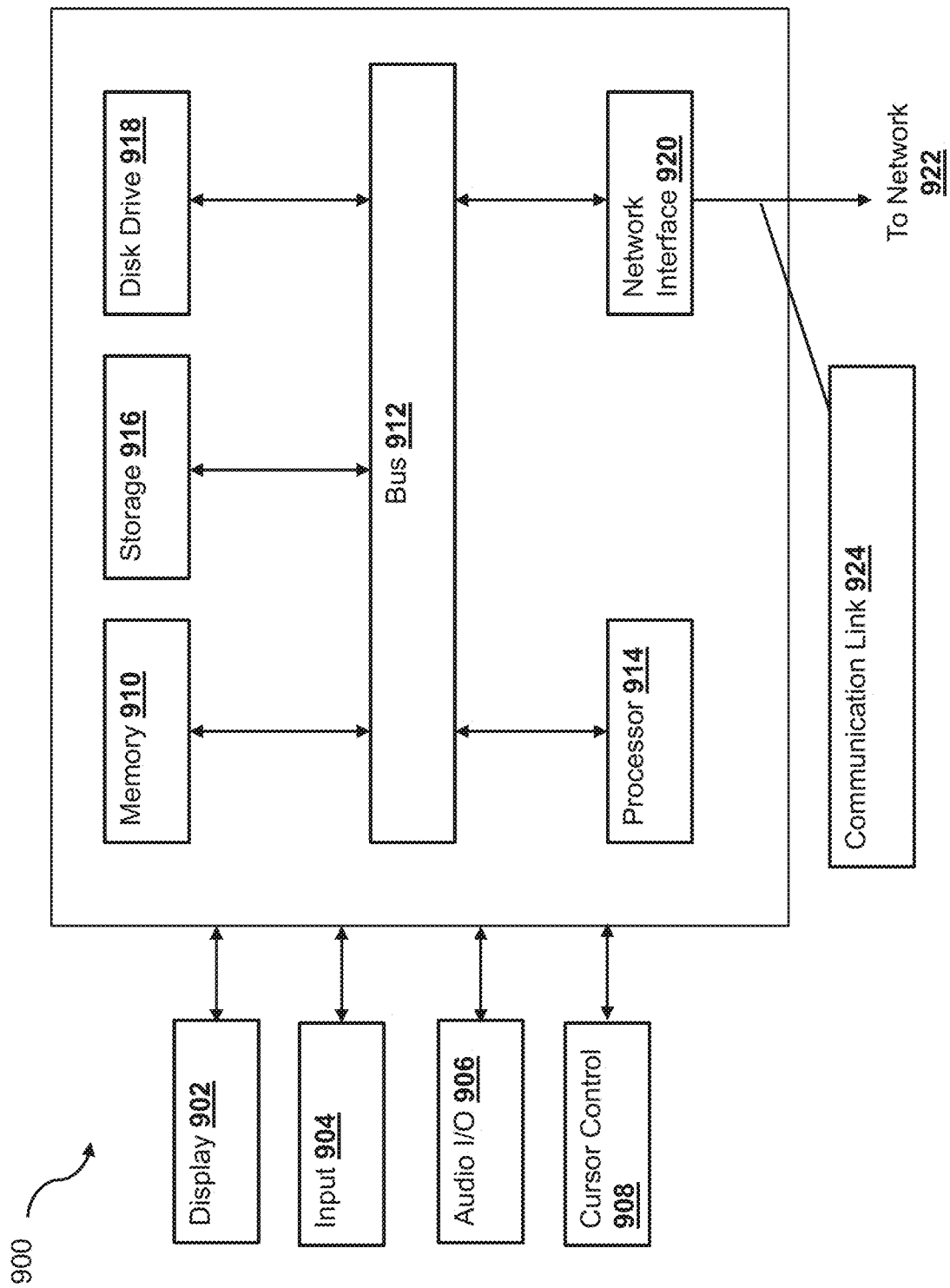

SYSTEMS AND METHODS FOR PREDICTING AND PROVIDING AUTOMATED ONLINE CHAT ASSISTANCE

CROSS REFERENCE TO RELATED APPLICATION

The present invention is a Continuation of U.S. patent application Ser. No. 16/665,709, filed Oct. 28, 2019 which is incorporated herein by reference in its entirety.

BACKGROUND

The present specification generally relates to facilitating an online chat session, and more specifically, to predicting and providing automated online chat assistance in an online chat session according to various embodiments of the disclosure.

RELATED ART

Service providers that provide services (e.g., purchases of goods, payment transactions, etc.) to customers often enable their customers to initiate direct communication with the service providers via one or more media or communication channels. For example, a customer may contact the service provider directly via phone or e-mail. However, these traditional communication channels suffer from multiple disadvantages. E-mail communication prevents the customers from receiving real-time feedback from the service provider. Calling the service provider via phone may require a long waiting time. Furthermore, certain information, such as transaction identifiers, may be difficult to communicate verbally over the phone, and thus, may be error-prone. As such, it has become increasingly popular for service providers to enable customers to communicate directly with them via an online chat session.

Through an online chat client program, such as a mobile chat program or a chat client that is embedded within a service provider's website, etc., a customer may conduct a real-time conversation with the service provider. Through a dialogue (e.g., exchanges of chat messages, also referred to as utterances herein), the service provider may quickly identify an issue that the customer would like to address (e.g., an intent), collect sufficient information from the customer, and address the issue raised by the customer. To achieve higher scalability and reduction of cost, the service provider may use a chat robot to assist in resolving at least some of the inquiries. The chat robot may determine (e.g., predict) an intent of the customer based on one or more utterances provided by the customer via an online chat session, and may assist in resolving an issue of the customer by having an automated dialogue with the customer. However, as utterances provided by customers during online chat sessions can be drastically different from languages normally used by people in a formal writing, automatic prediction of an intent of the customer based on utterances (e.g., using a natural language intent predictor) can be challenging. Thus, there is a need for developing an advanced intent predictor for predicting intent based on utterances and providing a mechanism for integrating the advanced intent predictor into an online chat robot system.

BRIEF DESCRIPTION OF THE FIGURES

FIG. 9 is a block diagram of a system for implementing a device according to an embodiment of the present disclosure.

Figure 1:
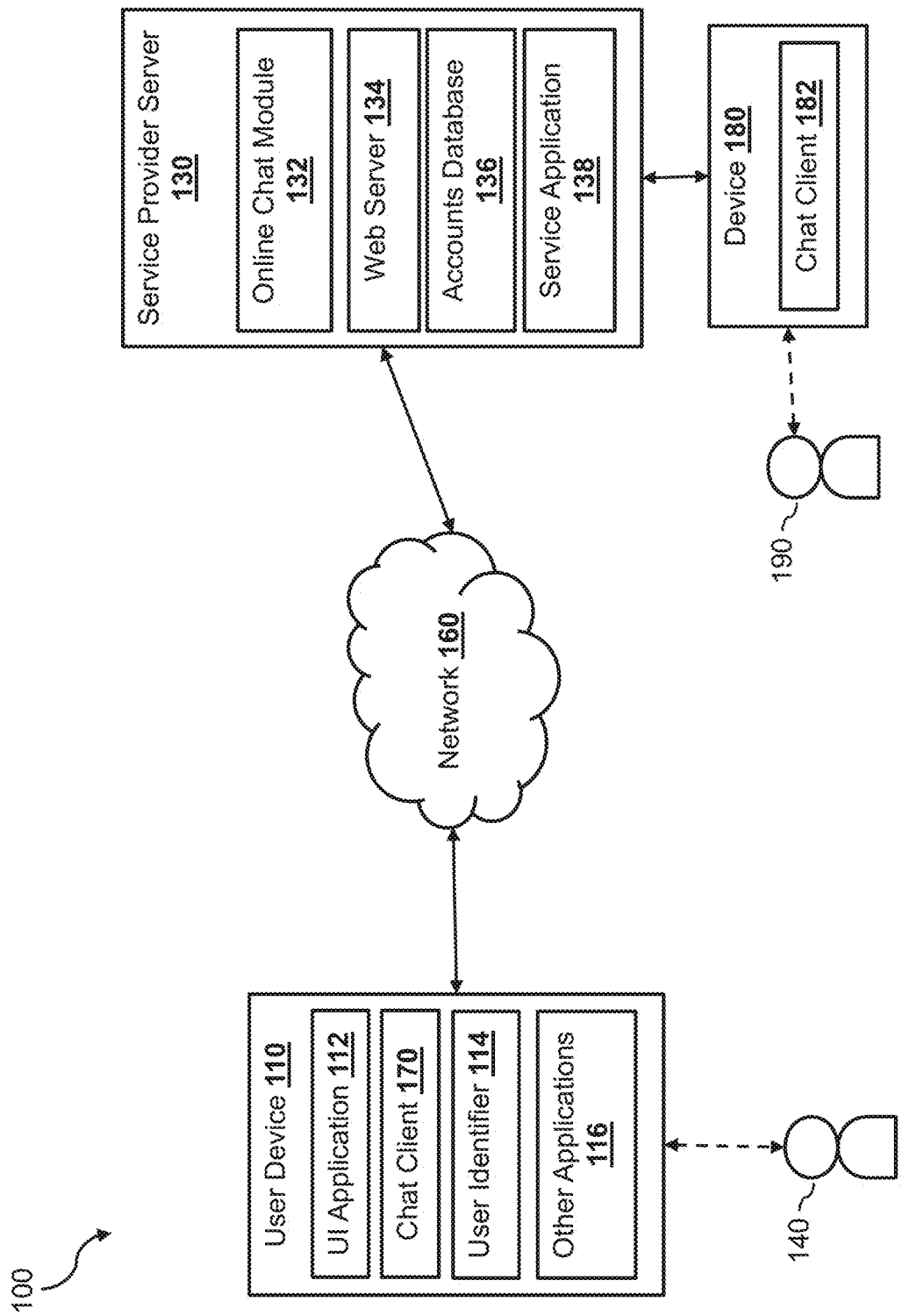
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for predicting and providing automated online chat assistance in an online chat session. As discussed above, a service provider may utilize an online chat system that may include a chat robot (also referred to as a chat bot or simply a bot) to provide automated assistance to a customer in an online chat session. In some embodiments, the chat robot system may include algorithms to automatically provide a dialogue with the customer via the online chat session. For example, upon receiving a request to establish an online chat session from a user device of a customer, the online chat system may establish the online chat session between the user device and the chat robot. The online chat system may then use the chat robot to assist the customer via the online chat session.

In some embodiments, the online chat system may provide assistance to the customer via the online chat session based on an intent of the customer. Specifically, the online chat system may provide different types of assistance to customers based on different intents of the customers. When a customer requests to initiate an online chat session with the service provider, the customer may have a specific intent (e.g., a specific issue to be resolved). For example, the customer may want to inquire about a product or service offered by the service provider, inquire about information (e.g., a status, etc.) related to a transaction (e.g., a payment transaction, a fund transfer transaction, a refund transaction, an account creation transaction, etc.), file a dispute, cancel an order or a payment, query for suspicious emails, inquire about information related to an account of the service provider, and/or other types of inquiry via the online chat session. Based on the intent of the customer, the online chat system may perform a corresponding action, provide relevant information, and/or prompt the customer for additional relevant information via the online chat session.

For example, when the customer wants to inquire about a product, the online chat system may query information related to the product against a product database, and provide the information to the customer via the online chat system. On the other hand, when the customer wants to cancel an order or a payment, the online chat system may attempt to collect information related to the order or the payment (e.g., an order number, a payment date, an account number, etc.) from the customer, and may process the cancelation of the corresponding order. In some embodiments, the online chat system may include different workflows (e.g., conversation flows), wherein each workflow may correspond to a different pre-determined intent. Thus, when an intent of the customer is determined, a corresponding workflow (e.g., a conversation flow) may be used by the online chat system (and the chat robot) to conduct an online conversation with the customer via the online chat session to assist the customer.

In some embodiments, the online chat system may determine an intent of the customer based on one or more utterances (e.g., an inquiry, a statement, an expression, etc.) provided by the customer via the online chat session. For example, after the online chat session is established, the customer may transmit messages that include one or more utterances via the online chat session. The one or more utterances include natural language and are not provided based on a selection of one or more answer choices. As such, the chat robot as described herein is configured to conduct a conversation with the customer using natural language that is based on utterances that are open statements instead of based on selections of a predetermined limited number of answer choices. This provides advantages including a more direct and accurate way to determine intent instead of providing the customer a sequence of answer choices to try and narrow down an intent.

The online chat system may attempt to determine an intent of the customer based on the one or more utterances, for example, by using a first model (e.g., a natural language model). The first model may analyze the one or more utterances and make an intent prediction based on the analysis. In one example, the first model may be a keyword-based model, where each of several intents known to the online chat system is associated with one or more keywords. Thus, the first model may be configured to predict an intent (e.g., identify one of the several intents known to the online chat system) based on whether one or more keywords associated with the intent can be found in the one or more utterances.

In some embodiments, the first model may be a machine learning model that is trained using a training data set. The training data set usually includes a generic corpus for training a natural language processing model. However, the language used in utterances obtained during an online chat session can be drastically different than the language used in a formal writing. For example, utterances may include words in a short form such as "bc" for "because", "wrt" for "with respect to", "u" for "you", etc. Utterances (as opposed to formal writing) may also be prone to typographical errors, as they are usually typed in a small keyboard area (e.g., smart phones and tablet devices, etc.) and transmitted quickly with limited review time. Even with the help of auto-correction functions built into the user device, the auto-corrected word may be the wrong word (e.g., not the word intended by the customer). Thus, the first model may fail to determine an intent for the customer based on the one or more utterances.

Using utterances obtained during similar online chatting sessions as training data to further train the first model could improve the intent prediction performance of the first model. However, developing such training data requires labeling of the utterances, and manually labeling data can be labor-intensive and costly. Thus, in some embodiments, the online chat system may utilize a second model for predicting the intent of the customer. Specifically, the online chat system may utilize the second model for predicting the intent of the customer when the first model fails to predict the intent of the customer. The second model may be a different type of natural language processing model than the first model. For example, the second model may be a bidirectional encoder representations from transformations (BERT) model. A BERT model is a deep learning natural language model that analyzes a phrase (e.g., a sentence, a question, etc.) as a whole regardless of a directional flow of the words. In some embodiments, the second model (e.g., the BERT model) may analyze the phrase by deriving a context for each word in the phrase, where the context for each word may be derived based on surrounding (e.g., adjacent to the left and/or to the right) words (see "BERT: Pre-training of Deep Bidirectional Transformers for Language Understanding" by Devlin et al., arXiv:1810.04805v1, 2018, which is incorporated herein by reference in its entirety). As such, the second model may be able to process a phrase correctly even though the phrase is not a complete sentence, or includes inaccurate and/or missing words. Therefore, the second model may still be able to predict an intent of the customer based on the one or more utterances even when the one or more utterances include missing words and/or typographical errors, in which case the first model would fail to predict the intent due to the inability to identify keywords in the one or more utterances.

Since the first model may be tightly integrated with the functionality of the chat robot for facilitating a dialogue with the customer and the first model might have institutional knowledge of the service provider, replacing the first model with the second model in the online chat system may be costly and/or inefficient. Thus, according to various embodiments of the disclosure, the online chat system may utilize the second model to supplement the first model, instead of replacing the first model. In some embodiments, upon obtaining the one or more utterance from the user device of the customer, the online chat system may use the first model to determine an intent of the customer. If the online chat system determines that the first model is unable to predict an intent of the customer based on the one or more utterances, the online chat system may utilize the second model to predict the intent of the customer.

The second model of some embodiments may analyze the one or more utterances by deriving a context for each word in the one or more utterances based on the surrounding words, and predict an intent of the customer based on the derived contexts. In some embodiments, the second model may output a score for each intent in the several intent candidates known to the online chat system, where the score for each intent indicates a probability that the intent is associated with the one or more utterances. The online chat system of some embodiments may select, from the several intent candidates, a particular intent having a highest score. The online chat system may then provide the intent predicted by the second model to the chat robot and/or the first model such that the chat robot may provide a solution and/or a response to the user device (e.g., provide a dialogue with the customer) based on the predicted intent.

In some embodiments, instead of or in addition to providing the intent predicted by the second model to the chat robot in real time for servicing the customer, the online chat system may use the predicted intent to generate new training data for the first model. For example, the online chat system may store the one or more utterances obtained from the customer as a new training data set and label the one or more utterances with the intent predicted by the second model. The online chat system may use the new training data set (which may be combined with other new training data sets) to re-train the first model such that the first model may be improved over time with the assistance of the second model.

In some embodiments, the online chat system may determine that the second model is unable to predict an intent of the customer, for example, when none of the scores corresponding to the intent candidates is above a probability threshold (e.g., 60%, 70%, etc.). When it is determined that the second model also fails to predict an intent of the customer, the online chat system may connect a system device associated with a human agent of the service provider to the online chat session such that the human agent may assist the customer. In some embodiments, the online chat system may select a subset of intent candidates (e.g., two, three, etc.) having the highest scores determined by the second model, and provide the subset of intent candidates to the human agent (e.g., presenting the subset of intent candidates on the chat client running on the system device). Through a dialogue between the human agent and the customer via the online chat session, the human agent may determine the intent of the customer. The human agent may then provide the determined intent to the online chat system, for example, via the chat client. In one example, the subset of intent candidates is provided on the chat client in the form of selectable elements. Thus, after determining the intent of the customer, the human agent may select the selectable element on the chat client corresponding to the determined intent. The online chat system may then use the one or more utterances and the intent determined by the human agent to generate a new training data set for re-training the first model and/or the second model to further improve the performance of the first model and/or the second model.

FIG. 1 illustrates an electronic transaction system 100 within which the online chat system may be implemented according to one embodiment of the disclosure. The electronic transaction system 100 includes a service provider server 130 associated with a service provider and a user device 110 that may be communicatively coupled with each other via a network 160. The service provider server 130 may be communicatively coupled with a device 180 directly or via an internal network associated with the service provider. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 and/or other user devices similar to the user device 110 over the network 160. For example, the user 140 may use the user device 110 to log in to a user account with the service provider to access account services or conduct electronic transactions (e.g., account transfers or payments, purchase goods and/or services, sales of goods and/or services, receive payments of the sale, etc.) with the service provider server 130. Furthermore, the user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., selling, shopping, purchasing, bidding, etc.) with the service provider server 130 over the network 160. In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110 may also include a chat client 170 for facilitating online chat sessions with another chat client (e.g., the chat client 182 of the device 180, a chat robot, etc.). The chat client 170 may be a software application executed on the user device 110 for providing a chat client interface for the user 140 and for exchanging (e.g., transmitting and receiving) messages with the other chat client. For example, during an online chat session with the chat client 182, the chat client 170 may present a chat interface that enables the user 140 to input data (e.g., text data such as utterances, audio data, multi-media data, etc.) for transmitting to the chat client 182 or the chat robot. The chat interface may also present messages that are received from the chat client 182, and messages that have been transmitted to the chat client 182. In some embodiments, the messages may be presented on the chat client interface in a chronological order according to a chat flow of the online chat session. The chat client 170 may be an embedded application that is embedded within another application, such as the UI application 112. Alternatively, the chat client 170 may be a stand-alone chat client program (e.g., a mobile app such as WhatsApp®, Facebook® Messenger, iMessages®, etc.) that is detached from any other software applications executed on the user device 110.

The user device 110, in various embodiments, may include other applications 116 as may be desired in one or more embodiments of the present disclosure to provide additional features available to the user 140. For example, the applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be embedded within messages transmitted to other chat clients (e.g., the chat client 182 or the chat robot) via an online chat session, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may be communicatively coupled with the service provider server 130 via the network 160 within the system 100.

The service provider server 130, in one embodiment, may be maintained by an online service provider, which may provide services (e.g., selling of merchandise processing, performing electronic transactions, etc.). As such, the service provider server 130 may include a service application 138, which may be adapted to interact with the user devices (such as the user device 110) over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user (e.g., the user 140) may access a user account associated with the user and access various services offered by the service provider server 130, by generating HTTP requests directed at the service provider server 130.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

The service provider server 130 may also include an online chat module 132 that implements the functionality of the online chat system as disclosed herein. In some embodiments, the online chat module 132 comprises a chat server for facilitating and managing online chat sessions between chat clients (e.g., the chat clients 170 and 182, the chat robot of the online chat module 132, etc.). For example, when the online chat module 132 receive one or more messages transmitted from one of the chat clients 170 and 182, the interactive chat module 132 may process the messages and then transmit one or more corresponding messages to the other one of the chat clients 170 and 182 to be displayed on the corresponding chat interface. The online chat module 132 of some embodiments may also manage the chat flows of the online chat sessions. For example, as the online chat module 132 receives the one or more messages received from the chat clients 170 and 182 during an online chat session, the online chat module 132 may record the messages in the chat flow associated with the online chat session. The online chat module 132 may also store the chat flow in a persistent storage such that the chat flow may be accessed subsequently even after the online chat session is terminated. As disclosed herein, the online chat module 132 may also include a chat robot for providing automated assistance with the user 140 via an online chat session. Once an online chat session is established between the user device 110 and the chat robot of the online chat module 132, the online chat module may monitor the messages (e.g., utterances) transmitted during the online chat session. The online chat module 132 may also predict an intent of the user (e.g., the user 140) based on one or more utterances monitored during the online chat session. Based on the predicted intent, the online chat module 132 may provide a dialogue with the user 140 via the online chat session.

As discussed above, a device 180 may be communicatively coupled with the service provider server 130. The device 180 may be operated by an entity 190 such as a person (e.g., an employee of the service provider). The device 180 may include a chat client 182 that is similar to the chat client 170, which enable the entity 190 to generate and transmit messages to another chat client (e.g., the chat client 170) and view messages generated by the chat client 170 and content generated by the online chat module 132, as part of an online chat session. In some embodiments, when it is determined that the online chat module 132 is unable to provide automated chat assistance to the user 140 (e.g., the online chat module 132 is unable to predict an intent of the user 140 based on the one or more utterances), the online chat module 132 may connect the device 180 to the online chat session such that the person 190 may conduct a chat with the user 140 via the online chat session.

Figure 2:
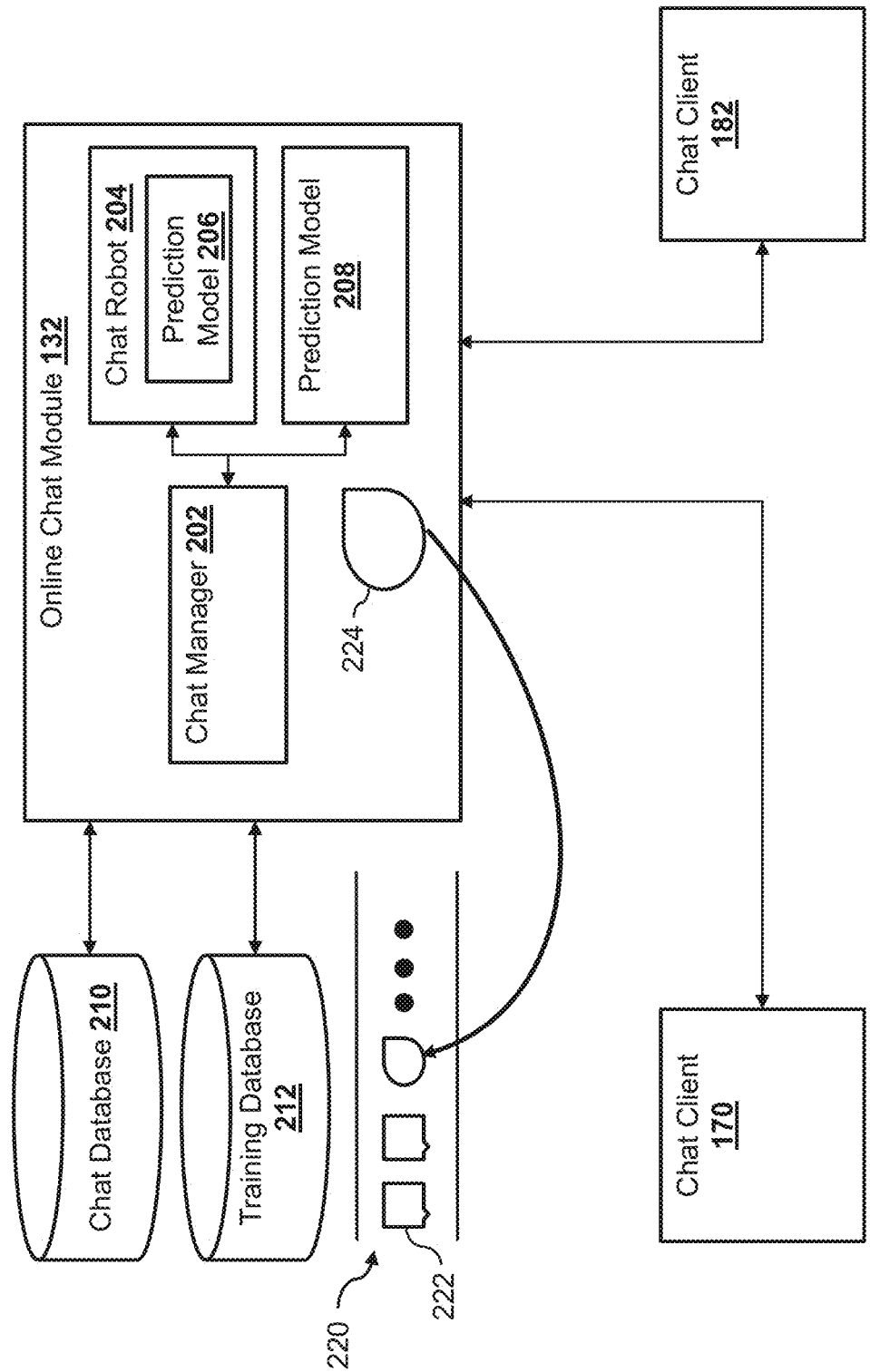
FIG. 2 is a block diagram illustrating an online chat module according to an embodiment of the present disclosure.

FIG. 2 illustrates a block diagram of the online chat module 132 according to an embodiment of the disclosure. The online chat module 132 includes a chat manager 202, a chat robot 204, a prediction module 206 that may be integrated within the chat robot 204, and another prediction model 208. The chat manager 202 may detect and/or establish an online chat session between two chat clients (e.g., the chat clients 170 and 182) and/or between a chat client (e.g., the chat client 170) and the chat robot 204 in response to a trigger (e.g., a user input on the chat client 170, etc.). The chat manager 202 and/or the chat robot 204 may monitor the messages (e.g., utterances, audio data, image data, etc.) being transmitted during the online chat session and may use the chat robot 204 to provide assistance to a user (e.g., the user 140) through a dialogue with the user 140 provided via the online chat session. For example, when an online chat session 220 has been established between the chat client 170 and the chat robot 204, the chat manager 202 may monitor messages (e.g., an utterance 222, etc.) transmitted from the chat client 170 to the chat robot 204. In some embodiments, the chat manager 202 may also store the messages from the same online chat session (e.g., the online chat session 222) in the chat database 210. The chat manager 202 and/or the chat robot 204 may use the prediction model 206 to analyze the utterances and predict an intent of the user 140 based on analyzing the utterances. The chat robot 204 may then provide a dialogue 224 (e.g., information related to the intent, an inquiry for additional information, a status, etc.) with the user 140 via the online chat session based on the predicted intent.

In some embodiments, when the chat manager 202 determines that the prediction module 206 is unable to determine (e.g., predict) an intent of the user 140 based on the utterance 222, the chat manager 202 may use another prediction model (e.g., the prediction model 208) to predict an intent of the user 140 based on the utterance 222. Being unable to determine/predict an intent may be based on an estimated accuracy of a determined/predicted intent. For example, if the prediction model 206 determines a predicted intent is only has a 40% accuracy, the chat manager 202 may then use another prediction model, but not if the predicted intent is estimated to have an 80% accuracy. Thus, an accuracy threshold may be used to determine whether the prediction model 206 is able or unable to determine an intent. Further, the threshold may be adjusted based on different factors, including the type of predicted intent and/or the user 140. For example, if the predicted intent is for return of an item, a higher threshold may be desired, as accuracy may be more important, while a predicted intent of a request for general information about an item or service may have a lower threshold. In another example, if the user 140 has a history of frustration with the service provider, a higher threshold may be desired to reduce the likelihood of the user being upset about an incorrect predicted intent that results in inaccurate content being displayed or conveyed in the chat session. In some embodiments, the prediction model 208 is a different type of natural language processing model from the prediction model 206, such that the prediction model 208 may be able to determine an intent based on the utterance 222 even when the prediction model 206 is unable to do the same. When the chat manager 202 obtains the intent predicted by the prediction model 208, the chat manager 202 may provide the intent to the chat robot 204 and cause the chat robot 204 to provide a dialogue (e.g., the dialogue 224) with the user 140 via the online chat session 220 based on the intent predicted by the prediction model 208. In addition, the chat manager 202 may generate training data based on the utterance 222 and the intent predicted by the prediction model 208, and use the training data to re-train the prediction module 206 to improve the prediction performance of the prediction model 206. For example, the chat manager 202 may store the training data in the training database 212. The chat manager 202 may then compile training data generated based on the intents predicted by the prediction model 208 and re-train the prediction model 206 (e.g., periodically).

In some embodiments, if the chat manager 202 determines that the prediction model 208 is unable to predict an intent based on the utterance 222, the chat manager 202 may connect a chat client 182 of the device 180 to the online chat session 222 such that a human agent (e.g., the person 190) can communicate with and assist the user 140 via the same online chat session 222.

Figure 3:
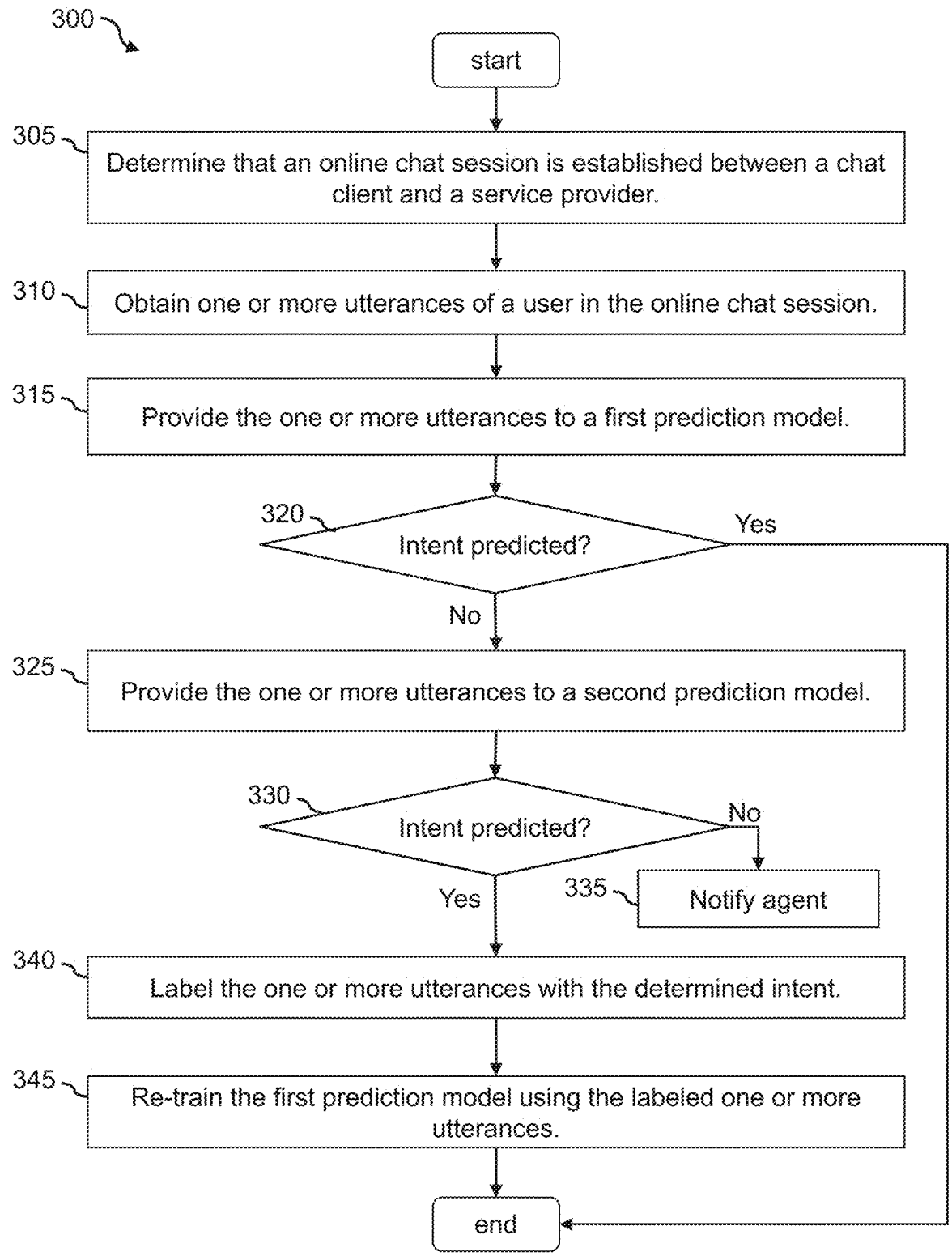
FIG. 3 is a flowchart showing a process of providing automated chat assistance in an online chat session according to an embodiment of the present disclosure.

FIG. 3 illustrates a process 300 for providing automated online chat assistance according to various embodiments of the disclosure. In some embodiments, the process 300 may be performed by the online chat module 132. The process 300 begins by determining (at step 305) that an online chat session is established between a chat client and a service provider. For example, a user, such as the user 140 may use the chat interface of the chat client 170 or the UI application 112 executed on the user device 110 to request an online chat session with the service provider. The user 140 may be associated with an account with the service provider and may have conducted one or more electronic transactions with the service provider server 130 using the account. The user 140 may initiate the online chat session with the service provider because the user has an issue (e.g., an inquiry about a product or a service provided by the service provider, a dispute with one of the transactions, requesting a refund from a transaction, an inquiry about a functionality of the website of the service provider, etc.) that needs to be resolved or has a request for information or content from the service provider.

In some embodiments, the chat client 170 is associated with the service provider server 130. For example, the chat client 170 may use a chat protocol associated with the online chat module 132 (e.g., the chat client 170 is a proprietary chat client associated with the service provider). In another example, the chat client 170 may be embedded within a website of the service provider generated by the web server 134. As such, the online chat module 132 may receive the request to initiate the online session from the user device 110. In response to receiving the request, the online chat module 132 may establish an online chat session (e.g., an online chat session 220) between the chat client 170 of the user device 110 and the chat robot 204.

In some embodiments, the chat client 170 may be a third-party chat client (e.g., WhatsApp®, Facebook® Messenger, iMessages®, etc.), and the online chat session is established by a third-party chat server between the chat client 170 and the chat robot 204. For example, the service provider server 130 may register a chat account with one or more of the third-party chat servers, and indicate to the third-party chat servers that any online chat session with the chat account (e.g., a request for an online chat session with the chat account) would be submitted to the online chat module 132 (e.g., an Internet Protocol (IP) address associated with the online chat module 132). As such, any request to initiate an online chat session with the chat account is received and handled by the online chat module 132. In response to receiving the request, the online chat module 132 may connect the chat robot 204 for engaging in the online chat session (e.g., the online chat session 220). The chat manager 202 may monitor activities of the chat client 170 and the chat robot 204 during the online chat session 220. As such, the online chat module 132 may determine that the online chat session 220 has been established between the chat clients 170 and the chat robot 204 from the activities.

The process 300 then obtains (at step 310) one or more utterances of a user in the online chat session. For example, the chat manager 202 monitors activities (e.g., chat messages including text data, audio data, image data, etc.) occurring via the online chat session 220. For example, the chat manager 202 may monitor chat messages that are exchanged between the chat client 170 and the chat robot 204 within the online chat session 220. After the online chat session 220 has been established, the user 140 may transmit one or more messages (e.g., one or more utterances) to the chat robot 204. As discussed above, the user 140 who initiated the online chat session 220 with the service provider may have an issue or a request to be addressed. For example, the user 140 may want to obtain information about a product or a service offered by the service provider, may want to file a dispute related to a past transaction, may want to inquire about a status of a transaction (e.g., a refund transaction, a purchase transaction, etc.), may want to cancel a past transaction, may want to query for suspicious emails, etc. As such, the user may submit an inquiry in the form of one or more utterances to the chat robot 204 using an interface of the chat client 170.

Figure 4:
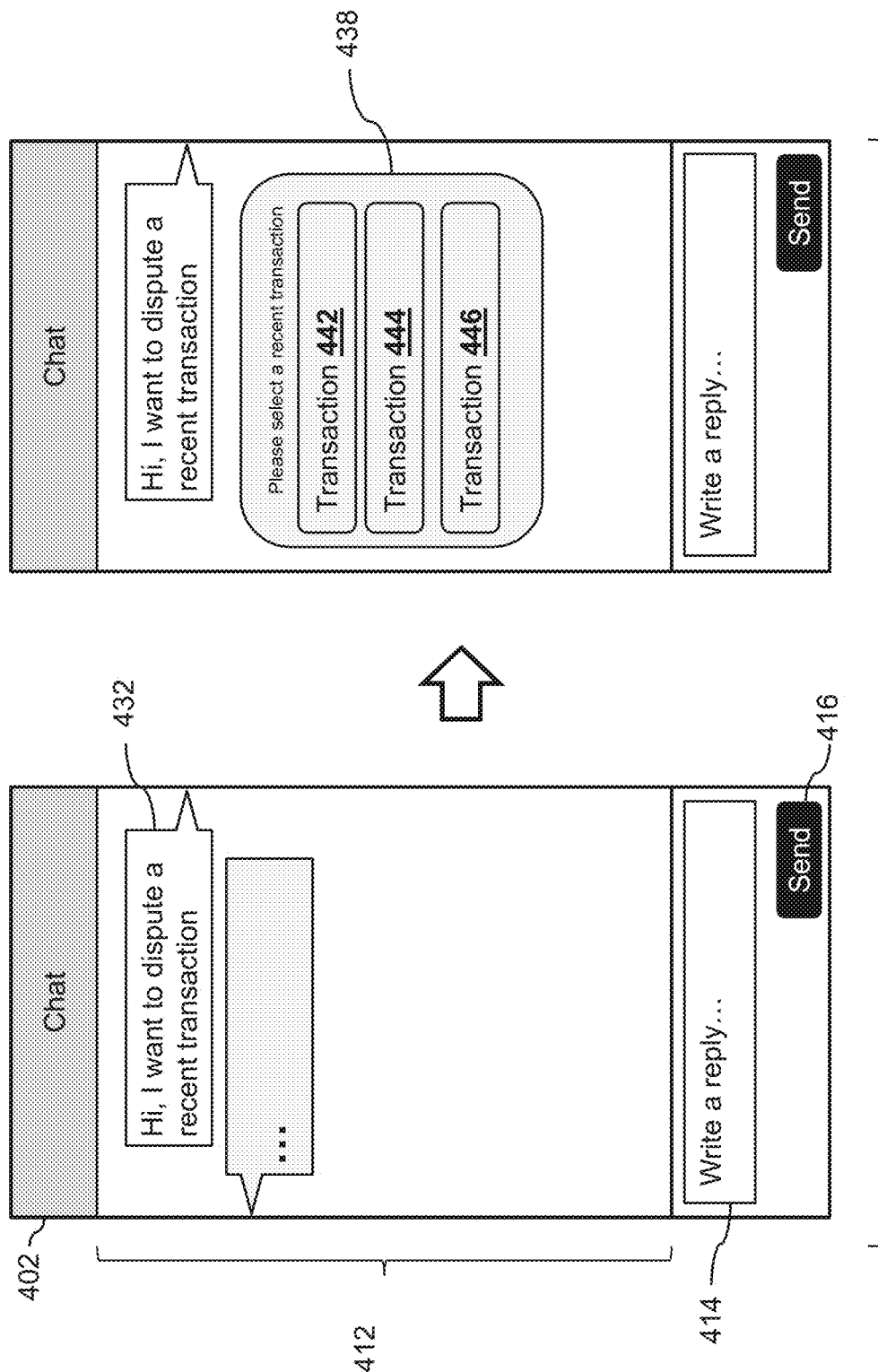
FIG. 4 illustrates an exemplary dialogue in an online chat session according to an embodiment of the present disclosure.

FIG. 4 illustrates an example chat interface 402 provided by the chat client 170. As shown in FIG. 4, the chat interface 402 includes a chat presentation portion 412 for displaying messages and/or content from a chat flow associated with the online chat session 220. The chat flow may include messages exchanged between the chat client 170 and the chat robot 204. The chat interface 402 also includes an input portion 414 that enables the user 140 to input a message (e.g., an utterance that may include text data, audio data, multi-media data, etc.) for transmitting to the chat robot 204 and a 'send' button 416 for submitting a message typed in the input portion 414.

In this example, the user 140 may transmit a message 432 (e.g., an utterance) "Hi, I want to dispute a recent transaction" by typing the message 432 in the input portion 414 and selecting the 'send' button 416. The user 140 may also speak the message, which may or may not then be converted to text. In one example where the chat client 170 uses the chat protocol associated with the online chat module 132, when the user 140 selects the 'send' button 416, the message 432 is first transmitted by the chat client 170 to the online chat module 132. The online chat module 132 may insert the message 432 into the chat flow associated with the online chat session 220, and transmit the message 432 as part of the chat flow to the chat robot 204. As the chat manager 202 monitors activities within the online chat session 220, the chat manager 202 may obtain the message 432 that was transmitted by the chat client 170 via the online chat session 220. Alternatively, the chat robot 204 may obtain the message 432 from the chat client 170 via the online chat session 220.

In response to obtaining the one or more utterances, the process 300 provides (at step 315) the one or more utterances to a first prediction model and determines (at step 320) whether the first prediction model is able to predict an intent of the customer based on the one or more utterances. For example, the chat manager 202 and/or the chat robot 204 may use the prediction model 206 to predict an intent of the user 140 based on the message 432. The service provider may have identified a set of possible intents associated with users who have initiated online chats with the service provider in the past. In one example, the set of possible intents may include an intent to obtain information about a product or a service, an intent to cancel a transaction, an intent to obtain information about a transaction, an intent to file a dispute regarding a past transaction, and an intent to inquire about a status of a transaction. The set of possible intents may be stored within or accessed by the online chat module 132.

In some embodiments, the prediction model 206 may be a natural language model (e.g., a machine learning model) configured to analyze natural language (e.g., a sentence, a phrase, a question, etc.) and to determine (e.g., predict) whether a message obtained from an online chat session is associated with any one of the set of possible intents. For example, the prediction model 206 may be a keyword-based model for analyzing natural language. In this example, the prediction model 206 may associate each intent in the possible intents with one or more keywords. For example, the prediction model 206 may associate the intent to file a dispute with keywords such as "dispute," "fight," "refund," "transaction," "order," and "claim." The prediction model 206 may also associate the intent to cancel a transaction with keywords such as "cancel," "remove," "transaction," "order," and "void." In some embodiments, each keyword (and/or each keyword combination that includes a subset of the keywords) may be assigned a weight. The prediction model 206 may analyze the message 432 to determine if the message 432 includes one or more keywords (or keyword combinations such as "dispute" and "transaction") associated with any one of the possible intents and may calculate a score for each possible intent based on the weights associated with the keyword(s) or keyword combination(s) included in the message 432. In some embodiments, the prediction model 206 may select an intent for the message 432 from the set of possible intents having the highest score or having the most number of associated keywords and/or keyword combinations included in the message 432.

Since the message 432 includes the word "dispute" and "transaction," which matches two keywords associated with the intent to file a dispute of a transaction, the prediction model 206 may output the intent to file a dispute of a transaction to the chat robot 204. The chat robot 204 may provide a dialogue to the user 104 and assist the user 104 based on the intent determined by the prediction model 206.

In some embodiments, the chat robot 204 may include different workflows that are associated with the different intents. Each workflow specifies a sequence of actions performed by the chat robot 204 and/or the chat manager 202. For example, the workflow for the intent to file a dispute for a transaction may include: retrieving recent transactions (e.g., transactions from a period of time) from a transaction database (e.g., the accounts database 136), provide a list of recent transactions for the user to select, receive a selection of a recent transaction, and creating a dispute entry in a dispute database. In another embodiment, the workflows may also be specific to the user 104. For example, an experienced user who has conducted many transactions with the service provider may be provided a more abbreviated workflow with fewer steps and less content for explanations and instructions, while a workflow for a new user may include more steps and more details.

Thus, when it is determined that the message 432 is associated with the intent to file a dispute for a transaction, the chat robot 204 and/or the chat manager 202 may select the workflow associated with the intent and/or the user to file a dispute. As such, the chat manager 202 and/or the chat robot 204 may retrieve a client identifier based on the message 432 (e.g., a device identifier that is attached to the message 432, etc.) and retrieve recent transactions associated with the client identifier from the accounts database 136. The chat robot 204 may then provide a list of the retrieved transactions to the user 104, for example, by transmitting the list of retrieved transactions to the user device 110 in a message via the online chat session 220. As shown in FIG. 4, the chat robot 204 has provided the list of retrieved transactions 442-446 on the chat interface 402 in a message 438 presented on the user device 110. In some embodiments, the list of retrieved transactions 442-446 presented on the chat interface 402 include selectable elements (e.g., buttons, links, etc.) that enable the user 104 to select one or more of the presented transactions. The chat robot 204 may receive a selection of one or more of the presented transactions (e.g., by receiving an indication of a transaction from another message transmitted from the user device 110 to the chat robot 204 via the online chat session 220, by receiving a selection of a selectable element corresponding to a transaction on the chat interface 402, etc.). Once the chat robot 204 receives a selection of a transaction, the chat manager 202 may create a new dispute entry for the transaction in a dispute database of the service provider server 130.

The intent prediction performance of the prediction model 206 generally depends on the training data (e.g., the quality and quantity of the training data) and the algorithm used to make the prediction. In some embodiments, the prediction model 206 may be trained using training data sets, where each training data set may include a message obtained by the online chat module 132 in the past and labeled with an associated intent. The training data may be prepared by a human who manually reviewed the messages (e.g., the utterances) and labeled the messages with the associated intent. However, as discussed above, manual labeling data can be labor-intensive and costly. As such the amount of training data available to train the prediction model 206 may be limited, which results in potential sub-par intent prediction performance by the prediction model 206 (e.g., inaccurate prediction or failure to determine an intent, etc.).

To increase the amount of training data for the prediction model 206, a generic corpus that includes generic sentences and phrases may be used. However, a drawback of such an approach is that utterances (e.g., short messages people transmit during a chat) usually includes informal language, which can be drastically different from sentences and phrases written in formal language. For example, utterances may include words in a short form such as "bc" for "because", "wrt" for "with respect to", "u" for "you", etc. Utterances (as opposed to formal writing) may also be prone to typographical errors, as they are usually typed in a small keyboard area (e.g., smart phones and tablet devices, etc.) and transmitted quickly with limited review.

Figure 5:
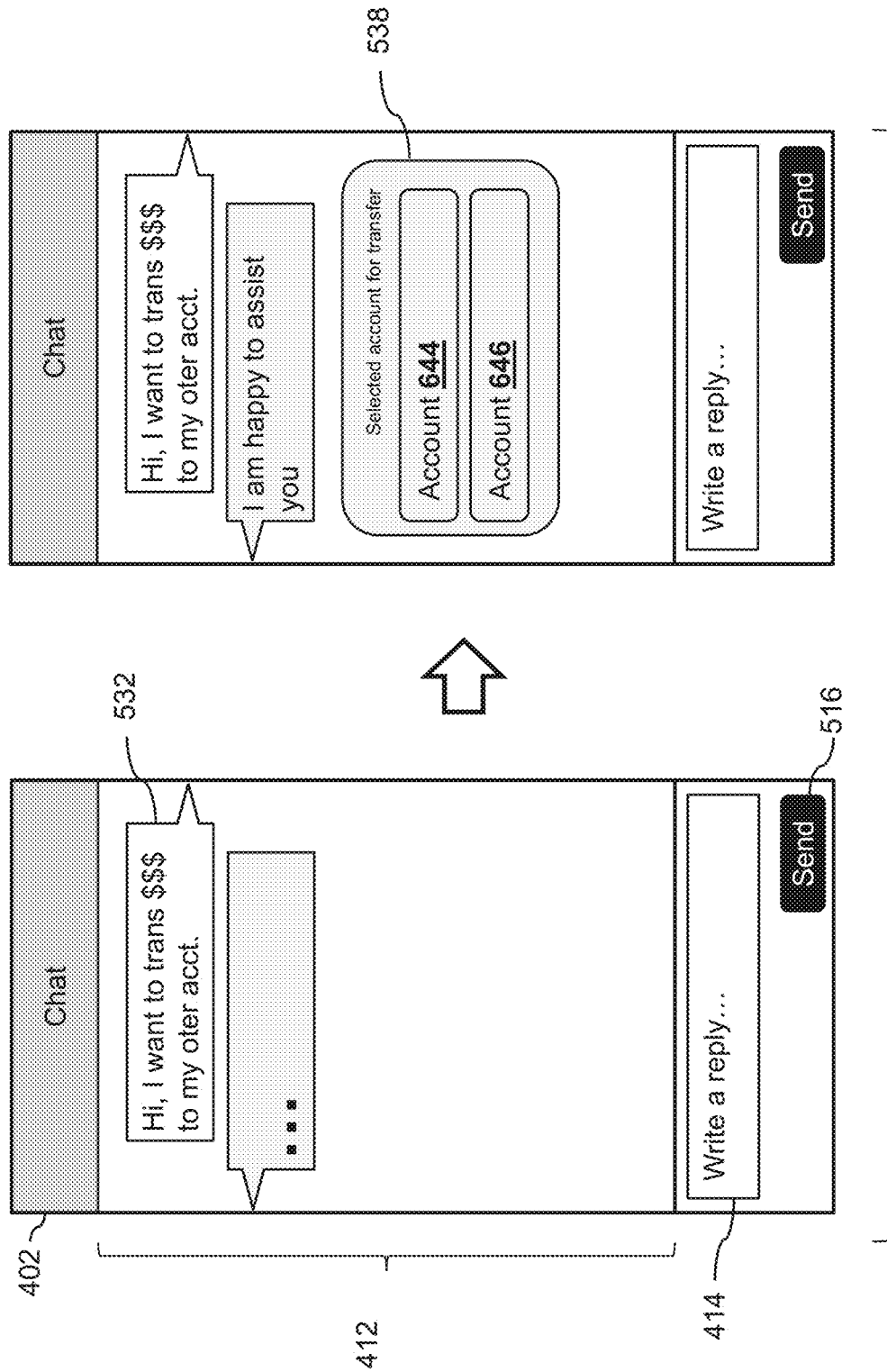
FIG. 5 illustrates another exemplary dialogue in an online chat session according to an embodiment of the present disclosure.

FIG. 5 illustrates another example utterance 532 provided by the user 104 during the online chat session 220. As shown in FIG. 5, the utterance 532 "Hi, I want to trans $$$ to my oter acct" includes several words in short form (e.g., "trans" and "acct"), a word with a typographical error (e.g., "oter"), and a symbol "$$$." A human can easily predict an intent based on the utterance 532 as the human can automatically translate the word "trans" to "transfer", the word "acct" to "account", the word "oter" to "other", and the symbol "$$$" to money, based on the context of the utterance 532. However, the prediction model 206 may not be able to predict an intent based on the utterance 532 because none of the keywords associated with the possible intents can be found in the utterance 532. As such, when the utterance 532 is provided to the prediction model 206, the prediction model 206 may output a value (e.g., null) to indicate that an intent is not determined.

In some embodiments, when the chat manager 202 determines that the prediction model 206 is unable to predict an intent based on an utterance (e.g., the utterance 532), the chat manager 202 may connect a human agent of the service provider to the user 140 by connecting a chat client of the human agent (e.g., the chat client 182 of the device 180) to the online chat session 220 such that the human agent may have a dialogue with the user 140 via the chat clients 170 and 182 through the online chat session 220. However, in order to provide further automated assistance in an online chat session, the chat manager 202 may not immediately connect a human agent to the online chat session 220 when the prediction model 206 fails to predict an intent of the user 104. Instead, the chat manager 202 may use a second prediction model (e.g., the prediction model 208) to assist the prediction model 206 in predicting an intent of the user 104 based on the utterance. Thus, the process 300 provides (at step 325) the one or more utterances to a second prediction model and determines (at step 330) whether the second prediction model is able to predict an intent based on the one or more utterances.

For example, the chat manager may provide the utterance (e.g., the utterance 532) to the prediction model 208 and determine whether the prediction model 208 is able to predict an intent of the user 104 based on the utterance 532. The prediction model 208 may be a different type of natural language processing model than the prediction model 206. For example, the prediction model 208 may be a bidirectional encoder representations from transformations (BERT) model. A BERT model is a deep learning natural language model that analyze a phrase (e.g., a sentence, a question, etc.) as a whole regardless of a directional flow of the words. In some embodiments, the second model (e.g., the BERT model) may analyze the phrase by deriving a context for each word in the phrase, where the context for each word may be derived based on surrounding (e.g., adjacent to the left and/or to the right) words (see "BERT: Pre-training of Deep Bidirectional Transformers for Language Understanding" by Devlin et al., arXiv:1810.04805v1, 2018). As such, the prediction model 208 may not rely on a completeness of the phrase or accuracy of the words in the phrase. Therefore, the prediction model 208 may still be able to predict an intent of the customer based on the one or more utterances even when the one or more utterances include missing words and/or typographical errors, in which case the prediction model 206 would fail to predict the intent due to the inability to identify keywords in the one or more utterances.

Since the prediction model 206 may be tightly integrated with the functionality of the chat robot 204 for facilitating dialogues with customers, and the prediction model 206 might have institutional knowledge of the service provider, replacing the prediction model 206 with the prediction model 208 (or any other improved natural language models) in the online chat module 132 may be costly and/or inefficient. Thus, according to various embodiments of the disclosure, the chat manager 202 may utilize the prediction model 208 to supplement the prediction model 206, instead of replacing the prediction model 206. Thus, if the chat manager 202 determines that the prediction model 206 is unable to predict an intent of the customer 104 based on utterance (e.g., the utterance 532), the chat manager 202 may utilize the prediction model 208 to predict the intent of the customer 104.

The prediction model 208 of some embodiments may analyze the utterance 532 by deriving a context for each word in the utterance 532 based on the surrounding words (e.g., words that are adjacent to the right and/or to the left), and predict an intent of the customer based on the derived contexts. In some embodiments, the prediction model 208 may also replace (or correct) a word based on the context derived for that word from surrounding words. For example, the prediction model 208 may derive a context for the word "trans" based on the surrounding words "want to" and "$$$ to", and may derive another context for the word "oter" based on the surrounding words "to my" and "acct." The derived context may be used to determine whether the words are misspelled or substituted with other symbols, and may replace the misspelled/substituted word with a correct word.

In addition, instead of outputting an intent selected from the set of possible intents, the prediction model 208 of some embodiments may output a score for each intent in the set of possible intents, where the score for each intent indicates a probability that the intent is associated with the utterance 532. The chat manager 202 may then select, from the several intent candidates, a particular intent (e.g., an intent to transfer money to another account) based on the scores. For example, the chat manager 202 may select a particular intent having a highest score. The chat manager 202 may then provide the intent predicted by the prediction model 208 to the chat robot 204 in real-time, such that the chat robot 204 may provide a solution and/or a response to the user 104 via the chat client 170 (e.g., provide a dialogue with the customer) based on the predicted intent seamlessly (e.g., without substantial delay such as more than a few seconds). For example, the chat robot 204 may select a workflow associated with the intent to transfer money to another account and begin performing actions according to the selected workflow, which may include retrieving accounts associated with the user 104 based on an identifier included in the utterance 532, providing the list of accounts to the user 104 on the chat client 170 via the online chat session 220, obtaining a selection of one of the accounts from the user 104, and performing the fund transfer transaction.

In some embodiments, instead of or in addition to providing the intent predicted by the prediction model 208 to the chat robot 204 in real time for servicing the user 104, the chat manager 202 may use the predicted intent to generate new training data for the prediction model 206. Thus, the process 300 labels (at step 340) the one or more utterances with the determined intent and re-trains (at step 345) the first prediction model using the labeled on or more utterances. For example, the chat manager 202 may store the utterance 532 obtained from the user 104 as a new training data set and label the utterance 532 with the intent predicted by the prediction model 208 (e.g., the intent to transfer money). The chat manager 202 may store the new training data set in the training database 212. The chat manager 202 may also use the new training data set (or accumulate the new training data set generated based on the utterance 532 with other new training data sets stored in the training database 212) to re-train the prediction model 206. The chat manager 202 may continue to accumulate new training data sets. For example, every time the prediction model 206 fails to determine (e.g., predict) an intent based on an utterance, the chat manager 202 may use the prediction model 208 to determine an intent. The chat manager 202 may continue to generate new training data sets with the assistance of the prediction model 208. Since the new training data sets are generated automatically without requiring a human to manually inspect the utterances and determine the associated intents, new training data sets can be generated in a cost-efficient manner. By continually generating new training data sets automatically and retraining the prediction model 206, the intent prediction performance of the prediction model 208 will be gradually improved.

In some embodiments, the chat manager 202 may determine that the prediction model 208 is unable to predict an intent of the user 104 based on the utterance (e.g., the utterance 532). For example, the chat manager 202 may determine that the prediction model is unable to predict an intent of the user 104 when none of the scores corresponding to the possible intents is above a probability threshold (e.g., 60%, 70%, etc.). When it is determined that the prediction model 208 also fails to predict an intent of the user 104, the chat manager 202 may connect a system device associated with a human agent of the service provider (e.g., the chat client 182 of the device 180) to the online chat session 220 such that the human agent (e.g., the user 190) may assist the user 104 over the online chat session 220.

In some embodiments, the chat manager may select a subset of possible intents (e.g., two, three, etc.) from the set of possible intents having the highest scores determined by the prediction model 208, and provide the subset of possible intents to the human agent 190 (e.g., presenting the subset of possible intents on the chat client 182). Through a dialogue between the human agent 190 and the user 140 via the online chat session 220, the human agent 190 may determine the intent of the user 140. The human agent 190 may then provide the determined intent to the online chat module 132, for example, via the chat client 182. In one example, the subset of possible intents is provided on the chat client 182 in the form of selectable elements. Thus, after determining the intent of the customer, the human agent 190 may select the selectable element on the chat client 182 corresponding to the determined intent. The chat manager 202 may then label the utterance 532 with the intent determined by the human agent 190 to generate a new training data set for re-training the prediction model 206 and/or the prediction model 208.

Figure 6:
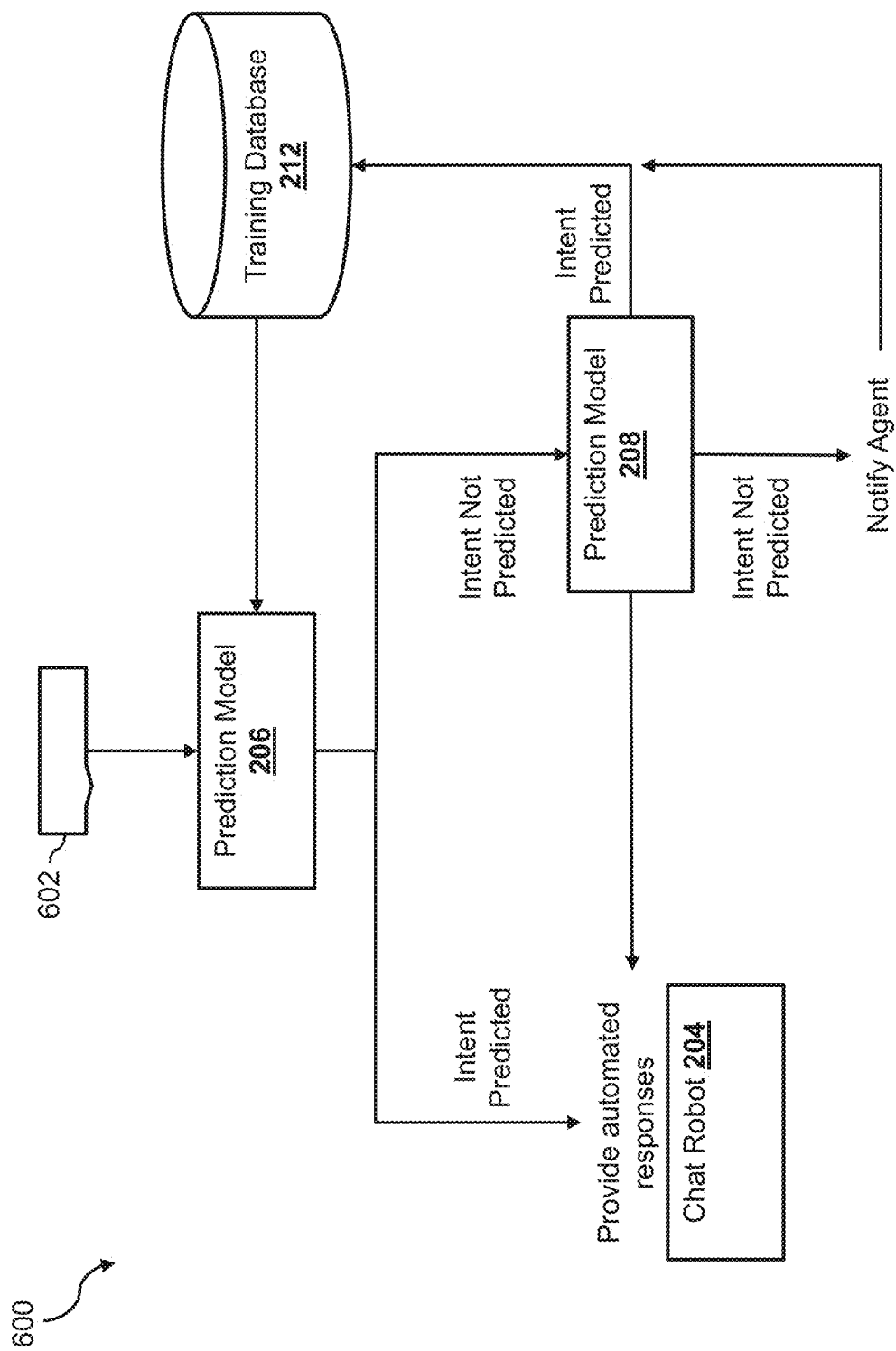
FIG. 6 illustrates a communication flow between prediction models in providing automated chat assistance in an online chat session according to an embodiment of the present disclosure.

FIG. 6 illustrates a communication flow 600 among various modules, such as the chat robot 204, the prediction model 206, and the prediction model 208, for providing automated online chat assistance according to various embodiments of the disclosure. As one or more utterances 602 (e.g., the utterance 222, the utterance 532, etc.) is obtained, for example, by the chat manager 202 based on monitoring activities of an online chat session (e.g., the online chat session 220), the one or more utterance 602 is provided to a first prediction model (e.g., the prediction model 206). In some embodiments, the first prediction model is integrated within a chat robot (e.g., the chat robot 204) that is configured to facilitate a dialogue with a user (e.g., the user 104) via the online chat session. The chat manager 202 may determine whether the prediction model 206 is able to determine an intent of the user 104 based on the one or more utterance 602 (e.g., selecting a particular intent from several known intents to be associated with the one or more utterance 602). If the chat manager 202 determines that the prediction model 206 is able to predict an intent of the user 104 (e.g., the prediction model 206 outputs an intent from a list of possible intents), the chat manager 202 may cause the chat robot 204 to provide automated responses to the user 104 via the online chat session 220 based on the predicted intent. On the other hand, if the chat manager 202 determines that the prediction model 206 is unable to predict an intent of the user 104 (e.g., the prediction model 206 outputs a null value or otherwise indicates that no intent is determined), the chat manager 202 may provide the one or more utterance 602 to a second prediction model (e.g., the prediction model 208).

If the prediction model 208 is able to predict an intent (e.g., the prediction model 208 outputs an intent from the list of possible intents, the prediction model calculated a highest score for one of the intents, etc.), the chat manager 202 may provide the intent predicted by the prediction model 208 to the chat robot 204 and cause the chat robot 204 to provide automated responses to the user 104 via the online chat session 220. In some embodiments, the chat manager 202 may also generate a training data set based on the one or more utterances 602. For example, the chat manager 202 may label the one or more utterances 602 with the intent predicted by the prediction model 208. The chat manager 202 may store the new training data set in the training database 212 and may use it (and possibly with other new training data sets) to re-train the prediction model 206 such that the intent prediction performance of the prediction model 206 can be improved.

If the chat manager 202 determines that the prediction model 208 is unable to predict an intent of the user 104 (e.g., the prediction model 208 outputs a null value, the highest score outputted by the prediction model 208 is below a threshold, etc.), the chat manager 202 may notify a human agent and may connect a device of the human agent to the online chat session 220 such that the human agent can assist the user 104. Once the human agent determines an intent of the user 104 after chatting with the user 104, the chat manager 202 may again use the intent determined by the human agent to generate a training data set. For example, the chat manager 202 may label the one or more utterance 602 with the intent determined by the human agent. The chat manager 202 may store the training data set in the training database 212 and/or use the training data set to retrain the prediction model 206 and/or the prediction model 208.

Using a second prediction model (e.g., the prediction model 208) to supplement a first prediction model (e.g., the prediction model 206) in providing automated online chat assistance enables the online chat module 132 to improve the performance of the chat robot 204 without substantial disruption to the software architecture and source code of the chat robot 204. Furthermore, the online chat module 132 also has the flexibility of using different prediction models to supplement the first prediction model 206. For example, if a new and improved prediction model is obtained subsequently, the prediction model 208 can be easily replaced by the new prediction model to supplement the prediction model 206. In addition, as new training data sets can be continually generated automatically based on the prediction model 208 (or any other secondary prediction models), the primary prediction model (e.g., the prediction model 206) can be improved over time.

Figure 7:
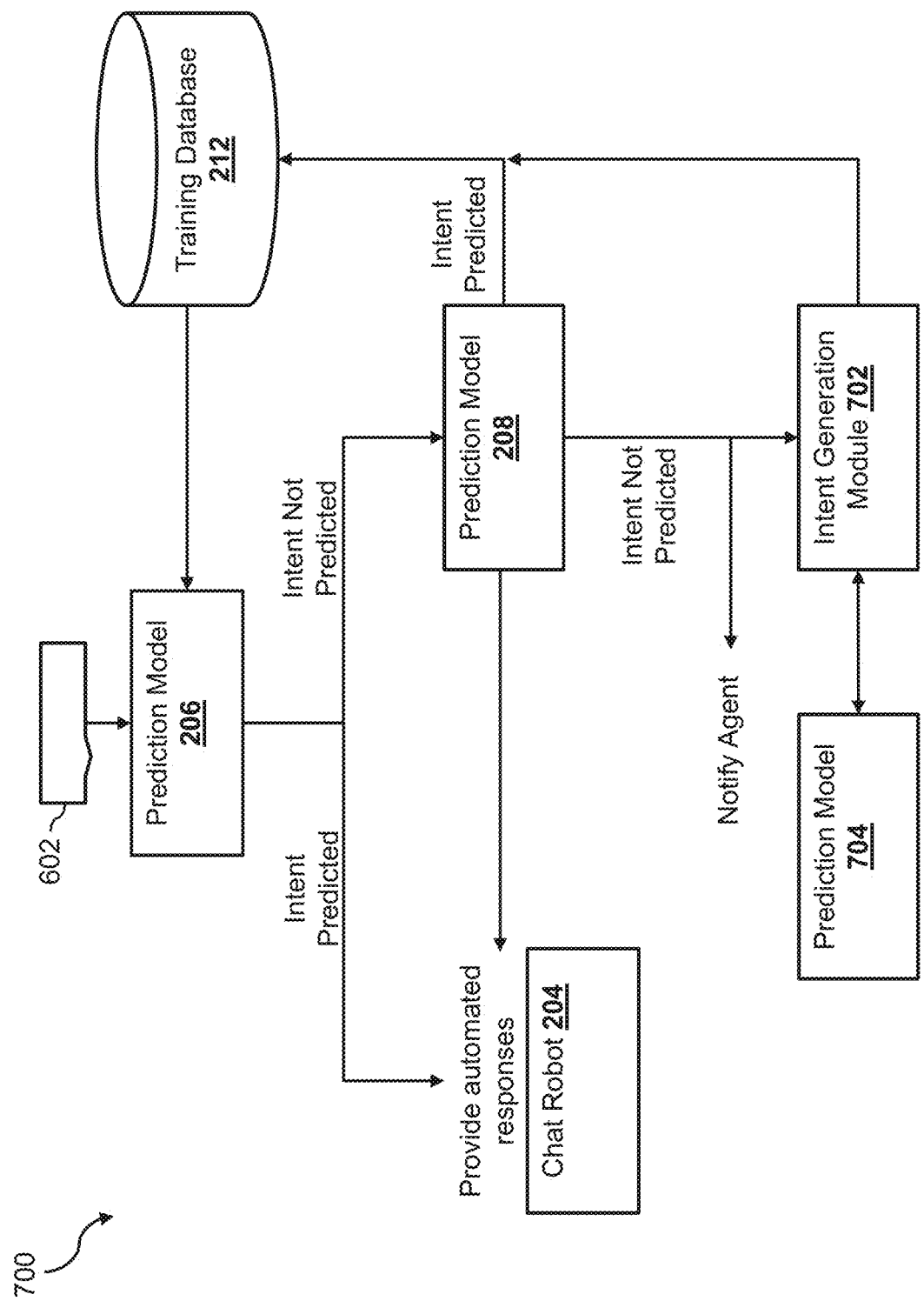
FIG. 7 illustrates a communication flow among different modules in generating new intents according to an embodiment of the present disclosure.

In some embodiments, when encountered utterances that neither the prediction model 206 nor the prediction model 208 can determine (e.g., predict) an intent, the online chat module 132 may determine that the utterances are associated with intent(s) that is not currently supported by the prediction models. As discussed above, the online chat module may send the utterance to a human agent and have the human agent assist the user via the online chat session 220. However, in some embodiments, the online chat module 132 may also use the unsupported utterances to derive new intents that are not currently supported, and generate new training data for the new intents for re-training the prediction model 206 and/or the prediction model 208. As shown in FIG. 7, when it is determined that the intent is not determined/predicted by the prediction models 206 and 208 based on an utterance (e.g., the utterance 602), the utterance 602 may be transmitted to a human agent, and also to an intent generation module 702.

Figure 8:
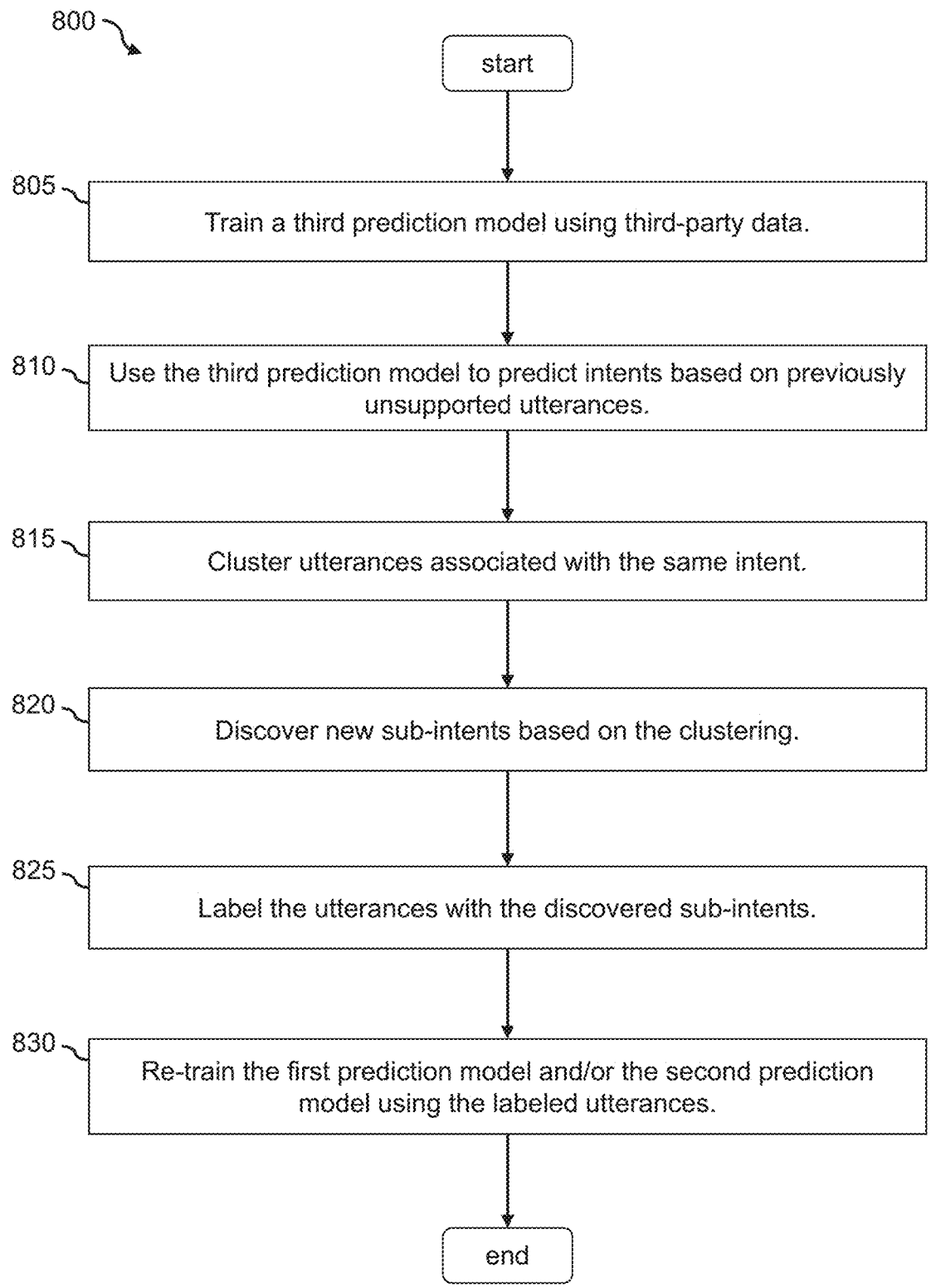
FIG. 8 is a flowchart showing a process of generating new intents according to an embodiment of the present disclosure.

In some embodiments, the intent generation module 702 may include or connect to a prediction model 704. The prediction model 704 may also be a bidirectional encoder representations from transformations (BERT) model (e.g., similar to the prediction model 208) or a different type of machine learning model. FIG. 8 illustrates a process 800 for determining new intents and generating new training data according to various embodiments of the disclosure. The process 800 may be performed by the intent generation module 702. The process 800 begins by training (at step 805) a third prediction model using third-party data. For example, the intent generation module 702 may initially train the prediction model 704 using third-party training data, such as data from an interactive voice response (IVR) system. For example, the IVR training data may include utterances provided by users over the phone during a conversation with the IVR system and labeled with an intent determined by the IVR system. It is noted that the utterances provided through the IVR system may be different from the utterances encountered by the online chat module 132 during an online chat session. For example, the utterances from the IVR system are generally shorter and consisting of only a few keywords instead of phrases and/or sentences in natural language. The IVR system may label the utterances based on a keyword-based algorithm in some examples. In some embodiments, the third-party training data includes intents that might not be supported by the prediction models 206 and 208. For example, the prediction models 206 and 208 may support only 15 intents, but the IVR system may support over 200 intents. Furthermore, since the IVR system may provide different types of assistance than the online chat module 132, the intents supported by the IVR system may not perfectly align with the online chat module 132.

After training the third prediction model using third-party data, the process 800 then uses (at step 810) the third prediction model to predict intents based on previously unsupported utterances. For example, the intent generation module 702 may use the prediction model 704 that has been initially trained with the third-party training data to determine (e.g., predict) an intent associated with the utterance 602. Since the prediction model 704 was trained using the third-party training data that includes intents not supported by the prediction models 206 and 208, the prediction model 704 may be able to determine an intent for the utterance 602 when the prediction models 206 and 208 failed to do the same. As such, the intent determined by the prediction model 704 for the utterance 602 may not be one that is supported by the prediction models 206 and 208.

In some embodiments, the intent generation module 702 continues to receive utterances that are not supported by the prediction models 206 and 208 (utterances that the prediction models 206 and 208 fail to determine intent for), and use the prediction model 704 to predict an intent based on those utterances. As discussed above, since the intents supported by the third-party system (e.g., the IVR system) may not align perfectly with the intents needed by the online chat module 132 and that the utterances received by the third-party system may inherently be different that the utterances received by the online chat module 132 in nature, the online chat module 132 may further modify and or process the intents determined by the prediction model 704. In some embodiments, the process 800 clusters (at step 815) the utterances associated with the same intent and discovers (at step 820) new sub-intents based on the clustering. For example, the intent generation module 702 may compile the utterances that are labeled with the intents determined by the prediction model 704. The intent generation module 702 may then groups the utterances based on the determined intent such that all of the utterances within each group have the same determined intent. The intent generation module 702 may then cluster the utterances within the same group (e.g., using a clustering algorithm such as a k-means algorithm) to determine sub-groups of utterances within the group having similar words in the utterances. In some embodiments, the intent generation module 702 may determine new sub-intents based on the common words appear in the sub-groups of utterances.

After discovering the new sub-intents, the process 800 then labels (at step 825) the utterances with the discovered sub-intents and retrains (at step 830) the first prediction model and/or the second prediction model using the labeled utterances. For example, the intent generation module 702 may generate new training data by labeling the utterances with the corresponding sub-intents. The intent generation module 702 may also train the prediction model 206 and/or the prediction model 208 using the new training data such that the prediction models 206 and 208 may be able to support the newly discovered intents.

In some embodiments, the process of clustering and re-training may be an iterative process, since even newer intents may be discovered (e.g., by the third party or by clustering of different sets of utterances). As such, utterances that have been previously labeled by the intent generation module 702 may be re-labeled with a different intent based on the different composition of utterances being clustered. Thus, in some embodiments, the intent generation module 702 may keep at least some of the existing utterances that have been previously labeled (e.g., storing in a data store). When new utterances are received, the intent generation module 702 may use the same techniques as described herein to determine the intent for the new utterances using the prediction model 704. In some embodiments, the intent generation module 702 may combine the new utterances with existing (and labeled) utterances retrieved from the data store, and perform clustering analysis based on the combination of the new and existing utterances. This way, the sub-intents being discovered and labeling of the utterances may be improved over time.

While the description above describes an embodiment of predicting intent and providing automated assistance in a text-based online chat session, it has been contemplated that the same techniques can be used to predict intent and to provide automated assistance in other types of chat sessions such as an audio-based chat session. For example, in some embodiments, the online chat system described herein may be implemented within an interactive voice response (IVR) system for providing automated assistance with a customer over a phone or over a voice over IP communication.

FIG. 9 is a block diagram of a computer system 900 suitable for implementing one or more embodiments of the present disclosure, including the service provider server 130, the user device 110, and the device 180. In various implementations, the user device 110 and/or the device 180 may include a mobile cellular phone, personal computer (PC), laptop, wearable computing device, etc. adapted for wireless communication, and the service provider server 130 may include a network computing device, such as a server. Thus, it should be appreciated that the devices 110, 180, and 130 may be implemented as the computer system 900 in a manner as follows.

The computer system 900 includes a bus 912 or other communication mechanism for communicating information data, signals, and information between various components of the computer system 900. The components include an input/output (I/O) component 904 that processes a user (i.e., sender, recipient, service provider) action, such as selecting keys from a keypad/keyboard, selecting one or more buttons or links, etc., and sends a corresponding signal to the bus 912. The I/O component 904 may also include an output component, such as a display 902 and a cursor control 908 (such as a keyboard, keypad, mouse, etc.). The display 902 may be configured to present a login page for logging into a user account, a checkout page for purchasing an item from a merchant, or a chat interface for facilitating an online chat session. An optional audio input/output component 906 may also be included to allow a user to use voice for inputting information by converting audio signals. The audio I/O component 906 may allow the user to hear audio. A transceiver or network interface 920 transmits and receives signals between the computer system 900 and other devices, such as another user device, a merchant server, or a service provider server via network 922. In one embodiment, the transmission is wireless, although other transmission mediums and methods may also be suitable. A processor 914, which can be a micro-controller, digital signal processor (DSP), or other processing component, processes these various signals, such as for display on the computer system 900 or transmission to other devices via a communication link 924. The processor 914 may also control transmission of information, such as cookies or IP addresses, to other devices.

The components of the computer system 900 also include a system memory component 910 (e.g., RAM), a static storage component 916 (e.g., ROM), and/or a disk drive 918 (e.g., a solid state drive, a hard drive). The computer system 900 performs specific operations by the processor 914 and other components by executing one or more sequences of instructions contained in the system memory component 910. For example, the processor 914 can perform the automated online chatting functionalities described herein according to the processes 300 and 800.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
   receiving, via a chat module, an utterance from a device during an online chat session;
   providing the utterance to a first prediction model of the chat module, wherein the first prediction model is configured to classify the utterance as one of a first plurality of intent classifications based on a plurality of words in the utterance;
   determining that the first prediction model fails to classify the utterance based on a first output of the first prediction model being associated with a confidence level below a threshold;
   in response to determining that the first prediction model fails to classify the utterance, classifying, using an output of a second prediction model configured to classify the utterance as one of a second plurality of intent classifications based on the plurality of words, the utterance as a particular intent classification of the second plurality of intent classifications, wherein the first plurality of intent classifications and the second plurality of intent classifications is at least partially overlapping, and wherein the particular intent classification is not included in the first plurality of intent classifications; and
   in response to determining that the second prediction model has succeeded in classifying the utterance that the first prediction model failed to classify, re-training the first prediction model of the chat module using training data generated based on the utterance and the output of the second prediction model.

2. The system of claim 1, wherein the second prediction model is trained using second training data derived from third-party data.

3. The system of claim 2, wherein the first prediction model is not trained using the second training data.

4. The system of claim 2, wherein the third-party data is associated with an interactive voice response system.

5. The system of claim 2, wherein the operations further comprise:
   clustering a group of utterances based on attributes associated with different portions of the group of utterances; and
   discovering that the particular intent classification not included in the first plurality of intent classifications is associated with one or more utterances in the group of utterances based on the clustering, wherein the second training data comprises the group of utterances.

6. The system of claim 5, wherein the operations further comprise:
   re-training the first prediction model using the one or more utterances in the group of utterances.

7. The system of claim 1, wherein the operations further comprise:
   subsequent to the re-training the first prediction model, receiving, via the chat module, a second utterance from a second device during a second online chat session;
   classifying, using the first prediction model, the second utterance as the particular intent classification; and
   processing the second utterance based on the particular intent classification.

8. A method, comprising:
receiving, by a computer system and via a chat module, an utterance from a device during an online chat session;
providing, by the computer system, the utterance to a first prediction model of the chat module, wherein the first prediction model is configured to classify the utterance as one of a first plurality of intent classifications based on a plurality of words in the utterance;
determining, by the computer system, that the first prediction model fails to classify the utterance based on a first output of the first prediction model being associated with a confidence level below a threshold;
in response to determining that the first prediction model fails to classify the utterance, classifying, by the computer system and using an output of a second prediction model configured to classify the utterance as one of a second plurality of intent classifications based on the plurality of words, the utterance as a particular intent classification of the second plurality of intent classifications, wherein the first plurality of intent classifications and the second plurality of intent classifications is at least partially overlapping, and wherein the particular intent classification is not included in the first plurality of intent classifications; and
in response to determining that the second prediction model has succeeded in classifying the utterance that the first prediction model failed to classify, re-training, by the computer system, the first prediction model of the chat module using training data generated based on the utterance and the output of the second prediction model.

9. The method of claim 8, wherein the second prediction model is trained using second training data derived from third-party data.

10. The method of claim 9, wherein the first prediction model is not trained using the second training data.

11. The method of claim 9, wherein the third-party data is associated with an interactive voice response system.

12. The method of claim 9, further comprising:
clustering a group of utterances based on attributes associated with different portions of the group of utterances; and
discovering that the particular intent classification not included in the first plurality of intent classifications is associated with one or more utterances in the group of utterances based on the clustering, wherein the second training data comprises the group of utterances.

13. The method of claim 12, further comprising:
re-training the first prediction model using the one or more utterances in the group of utterances.

14. The method of claim 8, further comprising:
subsequent to the re-training the first prediction model, receiving, via the chat module, a second utterance from a second device during a second online chat session;
classifying, using the first prediction model, the second utterance as the particular intent classification; and
processing the second utterance based on the particular intent classification.

15. A non-transitory machine-readable medium having stored thereon machine-readable instructions executable to cause a machine to perform operations comprising:
receiving, via a chat module, an utterance from a device during an online chat session;
providing the utterance to a first prediction model of the chat module, wherein the first prediction model is configured to classify the utterance as one of a first plurality of intent classifications based on a plurality of words in the utterance;
determining that the first prediction model fails to classify the utterance based on a first output of the first prediction model being associated with a confidence level below a threshold;
in response to determining that the first prediction model fails to classify the utterance, classifying, using an output of a second prediction model configured to classify the utterance as one of a second plurality of intent classifications based on the plurality of words, the utterance as a particular intent classification of the second plurality of intent classifications, wherein the first plurality of intent classifications and the second plurality of intent classifications is at least partially overlapping, and wherein the particular intent classification is not included in the first plurality of intent classifications; and
in response to determining that the second prediction model has succeeded in classifying the utterance that the first prediction model failed to classify, re-training the first prediction model of the chat module using training data generated based on the utterance and the output of the second prediction model.

16. The non-transitory machine-readable medium of claim 15, wherein the second prediction model is trained using second training data derived from third-party data.

17. The non-transitory machine-readable medium of claim 16, wherein the first prediction model is not trained using the second training data.

18. The non-transitory machine-readable medium of claim 16, wherein the third-party data is associated with an interactive voice response system.

19. The non-transitory machine-readable medium of claim 16, wherein the operations further comprise:
clustering a group of utterances based on attributes associated with different portions of the group of utterances; and
discovering that the particular intent classification not included in the first plurality of intent classifications is associated with one or more utterances in the group of utterances based on the clustering, wherein the second training data comprises the group of utterances.

20. The non-transitory machine-readable medium of claim 19, wherein the operations further comprise:
re-training the first prediction model using the one or more utterances in the group of utterances.

* * * * *